No. 657,377. Patented Sept. 4, 1900.
J. P. ADAMS.
GRAIN CLEANER.
(Application filed July 10, 1899.)
(No Model.) 2 Sheets—Sheet 2.
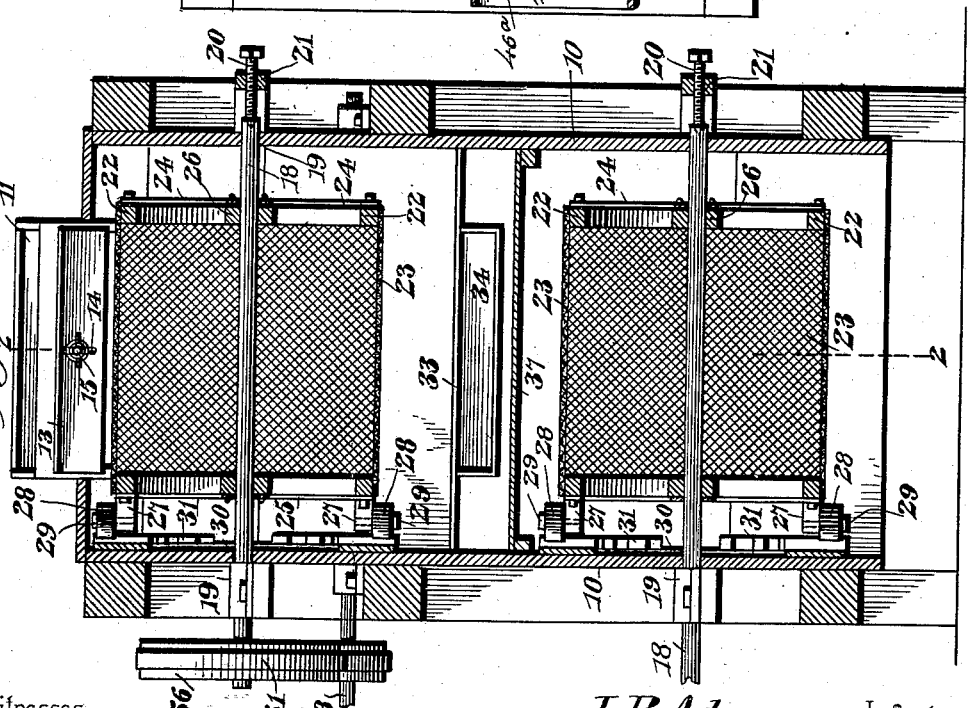

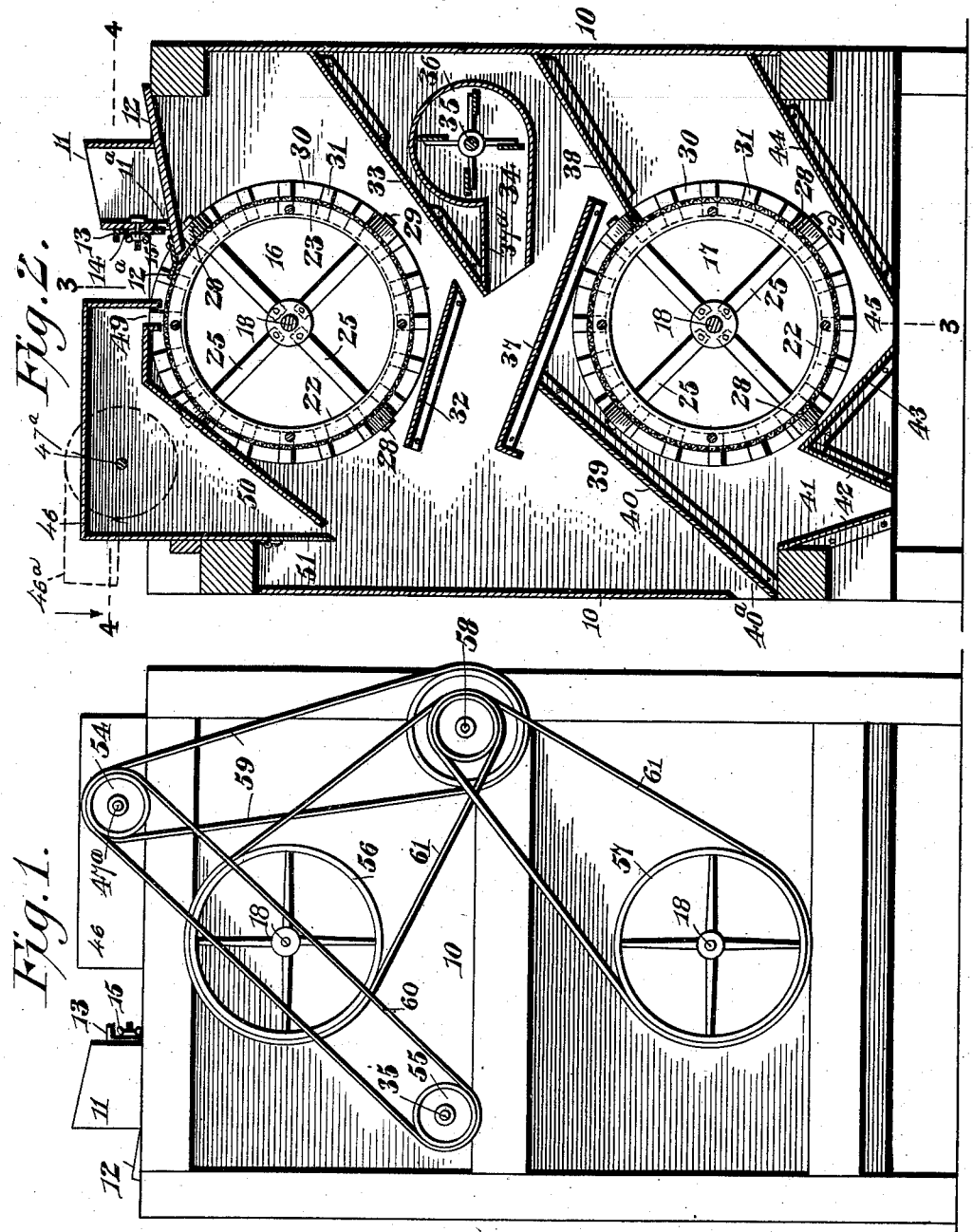

UNITED STATES PATENT OFFICE.

JOSEPH P. ADAMS, OF GARFIELD, WASHINGTON.

GRAIN-CLEANER.

SPECIFICATION forming part of Letters Patent No. 657,377, dated September 4, 1900.

Application filed July 10, 1899. Serial No. 723,352. (No model.)

*To all whom it may concern:*

Be it known that I, JOSEPH P. ADAMS, a citizen of the United States, residing at Garfield, in the county of Whitman and State of Washington, have invented a new and useful Grain-Cleaner, of which the following is a specification.

My invention relates to improvements in grain-cleaners adapted to be used as an attachment to or in connection with grain-separators, threshing-machines, and analogous structures, although it may be used singly as a grain-separator.

One object of the invention is to provide a cleaning mechanism as a substitute for the ordinary shaking-sieve for the purpose of cleaning and separating the grain from the chaff and small seeds, by which the tendency of the parts to become choked or clogged up is wholly obviated, thus promoting the efficiency and thoroughness in the operation of cleaning grain.

A further object is to provide means by which the grain is subjected while in a state of agitation to the action of an air-current which lifts the foreign matter from the surface of a reel and carries off such foreign matter to prevent the same from passing with the grain through the reel, said air-current also conveying away the light particles of chaff and dust which may be blown out of the grain by the action of a blast from a blast-fan.

With these ends in view the invention consists in the novel combination of mechanisms and in the construction and arrangement of parts, as will be hereinafter fully described and claimed.

In the drawings, Figure 1 is a side elevation of a grain-cleaner embodying my invention. Fig. 2 is a vertical cross-section through the cleaner on the plane indicated by the dotted line 2 2 of Fig. 3. Fig. 3 is a vertical transverse section at right angles to the plane of Fig. 2 and on the line 3 3 of said Fig. 2. Fig. 4 is a sectional plan view on the horizontal line 4 4 of Fig. 2.

The same numerals of reference are used to indicate like and corresponding parts in each of the several figures of the drawings.

The frame or casing of my improved grain-cleaner is indicated by the numeral 10, the same being shown as a generally-rectangular boxing arranged in an upright position; but it is evident that the contour and arrangement of the casing are not material. A feed-hopper 11 of any suitable type is supported on top of the casing in any approved way, and this hopper is provided with an inclined bottom board 12, which is arranged to discharge the grain upon the surface of one reel that is supported within the casing, said inclined board 12 having a yieldable flap $12^a$ at its free delivery end. A discharge-slot $11^a$ is provided in one wall of the hopper over the bottom board, and this slot is adapted to be partly or wholly closed by a sliding gate 13, which is provided with a vertical slot 14, through which slot passes a clamping-bolt 15, that is attached to the hopper, whereby the gate and bolt may be adjusted to vary the area of the slot $11^a$, and thus regulate the quantity of grain which may be fed to the upper revoluble reel 16.

My improved grain-cleaner is equipped with two reels 16 17, which are supported within the casing in different horizontal planes and preferably in the same vertical plane, although the arrangement of the reels directly one below the other is not essential. Each reel is carried by and revoluble with a horizontal shaft 18, which is arranged transversely with the casing and is journaled in suitable bearings 19 thereon. (See Fig. 3.) The ends of each reel-shaft are extended beyond the bearings in the casing, and against one end of the reel-shaft is arranged to operate the inner end of a regulating-screw 20, said screw supported in a fixed bracket 21, so as to lie in axial alinement with the reel-shaft and having an exposed head by which the screw may be conveniently rotated for the purpose of giving a limited endwise adjustment to the shaft 18 and the reel thereon. Each reel consists of a pair of ring-like or annular heads 22, a screen fabric 23, two series of straight radial elastic or spring arms 24 25, and the hubs 26. The hubs are made fast to the shaft at suitable intervals, so as to rotate with said shaft, and to each disk are secured the inner ends of one series of elastic or spring arms. The outer ends of the two series of spring-arms are fastened in any approved way to the annular heads which carry the reel fabric 23. One of the important features of my invention is the employment of two series of spring-arms for wholly supporting the cylindrical screen or fabric on the shaft, whereby the screen is adapted to rotate with the shaft, and its spring-arms permit the screen or reel to have a limited endwise movement with respect to and independently of the reel-shaft, and, moreover, the elastic supporting spring-arms, tending to remain straight, react upon each other and keep the screen in equilibrium or balanced and make the screen very sensitive to pressure exerted endwise thereon, so that very little force is needed to vibrate the screen, the springs acting in both directions longitudinally on the screen.

Each revoluble screen or reel is provided at one end thereof with a series of shoe-supports 27, which are preferably embodied in the form of blocks that are firmly fastened to one of the screen or reel heads. These series of supports or blocks have the series of roller-shoes 28 mounted idly thereon through the medium of the axles 29, the latter being fastened to the supports in any approved way, while the roller-shoes are fitted idly on the axles, so as to be sustained thereby in the same vertical plane beyond one end of the elastically-supported and revoluble reel or screen. An annular track 30 is provided with a series of radial ribs or shoulders 31, and this track is fixed to the inside of one wall of the casing 10, so as to lie in the same horizontal plane as and concentric with the revoluble cylindrical screen or reel. The ribbed track and elastically-supported reel or screen are arranged in close relation for the roller-shoes 28 to ride against the ribs or shoulders 31 of the annular track, said ribs or shoulders being disposed radially to the axis of the reel-shaft and in the path of the roller-shoes. The employment of the shoes on the elastically-supported and revoluble reel and adapted to ride on the ribbed track serves to give a jarring or vibrating motion to the reel or screen fabric, because the roller-shoes are adapted to ride upon the ribs to force the reel or screen positively in one direction against the tension of the spring-arms; but when the shoes clear the ribs and occupy the spaces in the intervals between said ribs the arms react to return the reel or screen to its initial position, whereby the reel or screen may be jarred to keep the meshes of the fabric in a clean condition free from accumulation of refuse and without imparting an endwise movement to the shaft by which the reel is rotated. It is evident that the shaft of each reel may be adjusted a limited distance by proper manipulation of the screw 20 to vary the position of the roller-shoes relative to the ribs of the annular track, and thus the extent of vibration given to the reel or cylinder may easily be regulated.

Below the upper revoluble reel or cylinder 16 are arranged the inclined cant-boards 32 33, the cant-board 32 lying directly below the reel 16 and inclined in a reverse direction to the cant-board 33. The two cant-boards are supported in fixed positions within the casing 10 in any suitable way, and the cant-board 33 is extended or carried below the edge of the cant-board 32 and is spaced relatively thereto to provide an opening or passage through which the seeds may fall or gravitate in a direction to expose the falling seed to the action of a blast of air from a fan 34. This fan is carried by a shaft 35, which is journaled in proper bearings of the casing 10, so as to lie in a horizontal plane below the reversely-inclined cant-boards. This fan 34 is inclosed by a casing 36, which is formed with a lip 37ª, that joins with the free edge of the cant-board 33, (see Fig. 2,) the discharge mouth or port of this fan-casing 36 being below and contiguous to the space between the cant-boards 32 33, whereby the fan 34 directs its blast of air through the falling seed for the purpose of carrying away the dirt, chaff, imperfect seeds, and refuse which may be contained in the grain. Another cant-board 37 is arranged in an inclined position between the upper and lower reels 16 17, said cant-board lying quite close to the upper surface of the lower reel 17 and occupying a spaced relation to the cant-board 32 for the purpose of forming a blast-passage between the boards 32 37, through which passage is adapted to travel the blast from the fan 34. The lower cant-board 37 is inclined toward an apron 38, which is situated below the blast-fan and is inclined toward the lower reel 17, said apron occupying a spaced relation to the lower edge of the cant-board 37 for the purpose of receiving the seeds which may be delivered from said cant-board to the apron, whereby the apron is adapted to discharge the grain upon the screen fabric of the lower reel or screen 17. A tailings-spout 39 is formed between the back wall of the casing 10 and an inclined wall 40, which is fixed below the cant-board 37 and to one side of the lower reel or screen 17, all as clearly shown by Fig. 2, said tailings-spout having a discharge-opening 40ª, by which the grain may be delivered from the cleaner to a suitable receptacle. The grain which is delivered upon the lower reel or cylinder 17 and which is too large to pass through the screen fabric thereof is carried over the cylinder during its revolution and deposited in a grain-spout 41, which is formed between the walls 42, while the seed which passes through the screen fabric of the reel is dropped into a spout 45, which is formed between the inclined walls 43 44 at the lower part of the casing, (see Fig. 2,) thus providing separate discharges for the desirable grain and the small seeds which may be separated therefrom by the action of the operative elements of my improved grain-cleaning machine.

A fan-casing 46 is fixed to the top of the machine-casing 10 in a position at one side of the feed-hopper 11, (see Fig. 4,) and within said casing 46 is contained a revoluble fan 47, the shaft 47ª of which is journaled in suitable bearings on the machine-casing 10. One end of this fan-casing communicates with a horizontal wind-trunk 48, which partially embraces the fan-casing, as shown by Fig. 4, and which wind-trunk is provided with an inlet-port 49. This inlet-port to the horizontal wind-trunk extends transversely across the machine-casing and lies contiguous to the upper surface of the upper revoluble reel or screen 16. The fan-casing 46 also has communication with a depending wind-trunk 50, which extends in a vertical direction into the machine-casing 10, so as to communicate with the chamber in said casing approximately on the plane of the shaft for the upper reel. This vertical wind-trunk is provided at its free depending end with a hinged flap-valve 51, adapted to regulate the strength of the suction-current which is created through the casing of the machine for the purpose of carrying away the refuse and imperfect seeds. It will be noted that the lower receiving end of the wind-trunk 50 is adapted to receive the exhaust or blast from the blast-fan 34, and the current which enters the wind-trunk is adapted to traverse the falling grain which may be discharged over the upper reel or screen 16, whereby the grain from the upper reel which flows into the tailings-spout 39 is cleaned and the impurities blown out of the grain by the blast from the fan 34, carried off by the suction-current through the vertical wind-trunk. The horizontal wind-trunk 48 has communication with one end of the fan-casing 46 by means of an inlet-port 49, and the current which may be drawn through the wind-trunk from the port 49 may be regulated by adjustment of a valve 53, which is shown by Fig. 4 as arranged to partly or wholly close the inlet-port 52. The fan-casing 46 is provided with a laterally-extending discharge-mouth 46ª, as shown by Fig. 4 and by dotted lines in Fig. 2, through which mouth the suction-current and the dust and light particles of refuse are blown by the action of the fan. It is to be observed that the mouth or port 49 of the horizontal wind-trunk lies contiguous to the upper surface of the screen 16, and the suction-current created through this wind-trunk by the rotary action of the fan 47 traverses the screen fabric of the reel 16, so as to lift the refuse which may lodge thereon, whereby the suction-current, in connection with the vibratory motion given by the screen, effectually overcomes clogging of the meshes in the screen fabric by the lodgment of grain therein.

The shaft of the suction-fan is provided with a pulley 54, while the blast-fan shaft has a pulley 55. The reel-shafts are provided with pulleys 56 57, and in a horizontal plane between the reel-shaft is arranged the driving-shaft 58. This driving-shaft is equipped with a series of pulleys for operating the shafts of the two fans and the two reels. An endless belt 59 drives the pulley 54 on the shaft of the suction-fan, and this last-named shaft drives an endless belt 60, which rotates the pulley 55 of the blast-fan. From suitable pulleys on the driving-shaft 58 extend the belts 61, which fit the pulleys 56 57 for the operation of the reels 16 17.

The grain or seed to be cleaned is deposited in the hopper 11, and by proper adjustment of the sliding gate the amount of grain which passes through the upper reel 16 may be regulated. The two reels are rotated by the motion given to their shafts, and at the same time the reels are vibrated independently without endwise movement of the shaft by the roller-shoes riding on the annular tracks. A part of the grain deposited on the upper reel 16 passes through the interstices in the screen fabric, so as to drop through the space of the reel and lodge upon the cant-boards 32 33, while the grain which is too large to pass through the screen fabric of the reel 16 is carried over the same and deposited in the tailings-chute 39. During this action of the reel 16 the grain is subjected to suction-current which passes through the port 49 and the horizontal wind-trunk, thus causing the air to pass in an upward direction through the top of the reel and making the suction-current have a tendency to lift the foreign matter off the reel and to carry the light matter to the fan 47. The grain which drops through the bottom of the upper reel is discharged to the cant-board 33 into the blast of air from the fan, so that the tailings will be blown into the screening-spout while the exhaust from the blast-fan is taken up by the suction-current through the depending wind-trunk and thence to the suction-fan, by which the refuse is blown through the discharge-mouth 46ª to a suitable place of discharge. The seed which lodges upon the cant-board 37 and the apron 38 is delivered to the lower reel 17, and some of the seeds pass through the fabric of said reel, so as to be discharged into the spout 45, while the larger seeds are carried over the reel and deposited in the spout 41. It is to be understood that the reels are to be covered with fabrics having meshes of proper size to separate seeds of one kind from grain of another kind—as, for example, if cockle-seed are to be separated from wheat the screens will be made of proper size for the cockle-seed to pass therethrough.

Changes may be made in the form and proportion of some of the parts while their essential features are retained and the spirit of the invention embodied. Hence I do not desire to be limited to the precise form of all the parts as shown, reserving the right to vary therefrom.

Having thus described the invention, what I claim is—

1. A horizontally-disposed revoluble screen, in combination with a revoluble shaft, and straight, radial, balancing spring-arms having their inner ends secured to said shaft, said straight, radial balancing spring-arms having their outer ends connected to the screen, and forming the sole supports thereof, and means to vibrate said screen longitudinally, independently of said shaft, substantially as described.

2. In a grain-cleaning machine, the combination with a casing and a revoluble reel therein, of the reversely-inclined cant-boards, 32, 33, situated below the reel and arranged relatively one to the other to form a grain-passage therebetween, a blast-fan having its mouth contiguous to one cant-board for discharging the blast of air to the grain which is discharged from said cant-board, a suction-fan casing, a fan therein, a horizontal wind-trunk having a mouth adjacent to the reel, and a valved wind-trunk communicating with the chamber of the machine-casing and arranged to receive the exhaust from the blast-fan, substantially as described.

3. A grain-cleaning machine comprising a machine-casing, the revoluble reels mounted in said casing one below the other, the reversely-inclined cant-boards below the upper reel, a blast-fan below said cant-boards, an inclined cant-board, 37, over the lower reel and in spaced relation to one cant-board to form therebetween a passage for the blast from said fan, an inclined apron, 38, below the cant-board, 37, and discharging to the lower reel, a discharge-chute below the cant-board, 37, and arranged to receive the tailings from the upper reel, and other discharge-chutes below the lower reel, substantially as described.

In testimony that I claim the foregoing as my own I have hereto affixed my signature in the presence of two witnesses.

JOSEPH P. ADAMS.

Witnesses:
G. J. BISHOP,
T. J. DEMOREST.